(12) United States Patent
Zhang et al.

(10) Patent No.: US 12,144,458 B2
(45) Date of Patent: Nov. 19, 2024

(54) PHYSICALLY NON-STICK STRUCTURE AND COOKING UTENSIL

(71) Applicant: ZHEJIANG SHINTOWN INDUSTRY CO., LTD, Zhejiang (CN)

(72) Inventors: Mingwei Zhang, Zhejiang (CN); Yiqi Yao, Zhejiang (CN); Jianzhong Tang, Zhejiang (CN)

(73) Assignee: ZHEJIANG SHINTOWN INDUSTRY CO., LTD, Zhejiang (CN)

( * ) Notice: Subject to any disclaimer, the term of this patent is extended or adjusted under 35 U.S.C. 154(b) by 0 days.

(21) Appl. No.: 18/395,695

(22) Filed: Dec. 25, 2023

(65) Prior Publication Data

US 2024/0298842 A1   Sep. 12, 2024

Related U.S. Application Data

(63) Continuation of application No. PCT/CN2023/117703, filed on Sep. 8, 2023.

(30) Foreign Application Priority Data

Mar. 8, 2023 (CN) .......................... 202310246936.1
Mar. 8, 2023 (CN) .......................... 202320483211.X
Jul. 27, 2023 (CN) .......................... 202310935625.6
Jul. 27, 2023 (CN) .......................... 202322007750.9

(51) Int. Cl.
 *A47J 36/02*   (2006.01)
(52) U.S. Cl.
 CPC .................................. *A47J 36/025* (2013.01)
(58) Field of Classification Search
 CPC ................................. A47J 36/025; A47J 36/02
 USPC ... 220/573.2, 573.1, 912, 62.17, 62.16, 608, 220/623
 See application file for complete search history.

(56) References Cited

U.S. PATENT DOCUMENTS

| 3,211,325 A | * | 10/1965 | Wisnicki | .................. C23C 4/18 159/DIG. 13 |
| 2008/0142526 A1 | * | 6/2008 | Cheng | ..................... A47J 36/02 220/573.1 |
| 2018/0311790 A1 | | 11/2018 | Feng et al. | |

FOREIGN PATENT DOCUMENTS

| CN | 101918186 A | 12/2010 |
| CN | 107495826 A | 12/2017 |
| CN | 206950017 U | 2/2018 |

(Continued)

OTHER PUBLICATIONS

Translation of CN111387795, Wang, Jul. 10, 2020, pp. 12, 20, and 23. (Year: 2020).*

(Continued)

*Primary Examiner* — Robert J Hicks
(74) *Attorney, Agent, or Firm* — Cooper Legal Group, LLC (57) ABSTRACT

The present application discloses a physically non-stick structure and a cooking utensil applied on a surface of a metal substrate, the physically non-stick structure includes a concave structure and a convex structure on at least a part of an area of the concave structure, at least a part of a surface of the concave structure and/or at least a part of a surface of the convex structure are provided with a physical vapor deposition layer, and a morphology of a surface of the physical vapor deposition layer is similar to a morphology of the surface of the concave structure and/or the surface of the convex structure covered by the physical vapor deposition layer.

10 Claims, 9 Drawing Sheets

(56) References Cited

FOREIGN PATENT DOCUMENTS

| | | |
|---|---|---|
| CN | 209252519 U | 8/2019 |
| CN | 111387795 A | 7/2020 |
| CN | 111493648 A | 8/2020 |
| CN | 214017158 U | 8/2021 |
| CN | 214128038 U | 9/2021 |
| CN | 115299780 A | 11/2022 |
| CN | 115741485 A | 3/2023 |
| CN | 219500849 U | 8/2023 |
| JP | H0559520 A | 3/1993 |

OTHER PUBLICATIONS

International Search Report of Corresponding Application No. PCT/CN2023/117703; Nov. 12, 2023; 4 Pgs.
First Office Action received in corresponding Japanese patent application No. 2023-221360, dated May 9, 2024, 8 pages.

\* cited by examiner

PHYSICALLY NON-STICK STRUCTURE AND COOKING UTENSIL

CROSS-REFERENCE TO RELATED APPLICATION

This application is a continuation of PCT application serial no. PCT/CN2023/117703, filed on Sep. 8, 2023, which claims priority and benefit of Chinese patent application serial no. 202310246936.1, filed on Mar. 8, 2023, Chinese Patent application serial no. 202320483211.X, filed on Mar. 8, 2023, Chinese Patent application serial no. 202322007750.9, filed on Jul. 27, 2023, and Chinese Patent application serial no. 202310935625.6, filed on Jul. 27, 2023. The entirety of PCT application serial no. PCT/CN2023/117703, Chinese patent application serial no. 202310246936.1, Chinese Patent application serial no. 202320483211.X, Chinese Patent application serial no. 202322007750.9, and Chinese Patent application serial no. 202310935625.6 are hereby incorporated by reference herein and made a part of this specification.

TECHNICAL FIELD

The present application relates to a field of a cooking utensil, and in particular, relates to a physically non-stick structure and a cooking utensil.

BACKGROUND ART

The existing cooking utensil can realize the non-stick performance by coating a layer of polytetrafluoroethylene. The layer of polytetrafluoroethylene is non-toxic under normal circumstances, but the layer begins to volatilize at the heating temperature of 260° C., and begins to decompose at the temperature of 350° C. So the use temperature of the non-stick pan with the layer of polytetrafluoroethylene generally cannot exceed 250° C. But by the general cooking utensils such as a frying pan, the heating temperature often exceeds 260° C., thereby existing potential safety risks. In addition, the coat is not wear-resistant, which has the risk of falling off, and is prone to be eaten with the food by mistake, thereby affecting healthy.

SUMMARY

In order to solve the above technical problem, the present application provides a physically non-stick structure and a cooking utensil, which can not only improve the non-stick performance of a surface of the cooking utensil, but also have advantages of high wear-resistance and is not easy to fall off.

In the first aspect, a physically non-stick structure configured for being applied to a surface of a metal substrate is disclosed, the physically non-stick structure comprises a concave structure and a convex structure in at least a part of an area of the concave structure, at least a part of a surface of the concave structure and/or at least a part of a surface of the convex structure are/is provided with a physical vapor deposition layer, and a morphology of a surface of the physical vapor deposition layer is similar to a morphology of the surface of the concave structure and/or a morphology of the surface of the convex structure covered by the physical vapor deposition layer.

By adopting the above solution, the concave structure is processed in the surface of the metal substrate, then the convex structure is processed on the concave structure, wherein the concave structure and the convex structure can constitute a hydrophobic structure on the surface of the metal substrate, but such a hydrophobic structure is not wear-resistant. After processing the concave structure and the convex structure, the surface of the concave structure and the surface of the convex structure are coated with a physical vapor deposition layer, which possesses a wear-resistant performance. The surface of the physical vapor deposition is hydrophobic similar to the concave structure and the convex structure because the physical vapor deposition layer has a morphology similar to the concave structure and the convex structure. Therefore, the surface of the metal substrate has the wear-resistant performance and the non-stick performance via the physically non-stick structure processed on the surface of the metal substrate.

Combined with the first aspect, Furthermore, the concave structure and the convex structure are integrated with the metal substrate, and the physical vapor deposition layer directly contacts the concave structure and/or the convex structure.

By adopting the above solution, the concave structure and the convex structure are directly processed on the surface of the metal substrate, wherein the strength of an integrated structure is higher, which can reduce the risk of falling off caused by a two-piece structure. The physical vapor deposition layer directly contacts the concave structure and the convex structure without a transition layer between them, which can reduce the process steps and the process cost.

Combined with the first aspect, furthermore, the concave structure comprises a plurality of recesses, and each of the plurality of recesses has a depth of 45-85 micrometers.

Please amend paragraph of the originally filed specification as follows: By adopting the above solution, the plurality of recesses on the surface of the metal substrate can effectively lock oil during cooking, such that the oil can be more evenly distributed, thereby effectively improving the non-stick performance. The plurality of recesses with the depth of 45-85 millimeters not only have a good effect of locking oil, but also have a good bonding strength with the physical vapor deposition layer, so that the physical vapor deposition layer can be directly plated on the surface of the recesses without the transition layer of the traditional process, thereby reaching a reliable strength and reducing the process steps and the cost.

Combined with the first aspect, furthermore, the concave structure is formed by the plurality of recesses arranged in an orthogonal array, and each of the plurality of recesses has a diameter of 0.3-0.55 millimeters, a depth of 55-75 micrometers, and a hole center distance of 0.6-0.8 millimeters.

By adopting the above solution, the concave structure is formed by a plurality of recesses arranged in an orthogonal array and distributed evenly, and each of the plurality of recesses has a diameter of 0.3-0.55 millimeters, a depth of 55-75 micrometers, and a hole center distance of 0.6-0.8 millimeters, such that the surface of the metal substrate possesses the hydrophobicity to a certain extent, and that the bonding performance between the metal substrate and the physical vapor deposition layer can be improved, which reduces the risk of falling off of the physical vapor deposition layer Combined with the first aspect, furthermore, a thickness of the physical vapor deposition layer is 0.8-1.45 micrometers.

By adopting the above solution, the thickness of the physical vapor deposition layer is controlled in a set range, which can effectively realize that the physical vapor deposition layer can have the morphology similar to the concave structure and the convex structure, such that the surface of the physical vapor deposition layer possesses the non-stick performance, when the physical vapor deposition layer is covered on the surface of the concave structure and of the convex structure.

Combined with the first aspect, furthermore, the convex structure comprises a plurality of protrusions at least on a part of the surface of the concave structure, and a height of each of the plurality of protrusions is 0.1-0.3 micrometers.

By adopting the above solution, the convex structure is at least provided on a part of the surface of the concave structure, wherein the height of the protrusion is 0.1-0.3 millimeters, which can further improve the hydrophobicity of the concave structure, improve the non-stick performance of the surface of the metal substrate, and which can further improve the bonding strength between the physical vapor deposition layer and the metal substrate, thereby reducing the risk of falling off of the coating.

In the second aspect, the other physically non-stick structure configured for being applied to a surface of a metal substrate is disclosed, the physically non-stick structure comprises a shot-peened layer on the surface of the metal substrate and a physical vapor deposition layer on a surface of the shot-peened layer, the surface of the shot-peened layer is configured with a concave structure and a convex structure, and a morphology of a surface of the physical vapor deposition layer is similar to a morphology of the surface of the shot-peened layer covered by the physical vapor deposition layer.

By adopting above solution, the concave structure and the convex structure are processed on the surface of the metal substrate by shot peening process, wherein the concave structure and the convex structure can form a hydrophobic structure on the surface of the metal substrate, but such a hydrophobic structure is not wear-resistant. After processing the concave structure and the convex structure by shot peening process, the surface of the concave structure and the surface of the convex structure are coated with a physical vapor deposition layer, which possesses a wear-resistant performance. The surface of the physical vapor deposition is hydrophobic similar to the concave structure and the convex structure because the physical vapor deposition layer has a morphology similar to the concave structure and the convex structure. Therefore, the surface of the metal substrate has the wear-resistant performance and the non-stick performance via the physically non-stick structure processed on the surface of the metal substrate.

Combined with the second aspect, furthermore, the metal substrate is integrated with the shot-peened layer, and the physical vapor deposition layer directly contacts the shot-peened layer.

By adopting the above solution, the concave structure and the convex structure are directly processed on the surface of the metal substrate by shot peening process, wherein the strength of an integrated structure is higher, which can reduce the risk of falling off caused by a two-piece structure. The physical vapor deposition layer directly contacts the concave structure and the convex structure without a transition layer between them, which can reduce the process steps and the process cost, and the wear-resistant performance and the non-stick performance can also be realized.

Combined with the second aspect, furthermore, an electrolytic layer is provided between the shot-peened layer and the physical vapor deposition layer.

By adopting the above solution, the surface of the shot-peened layer is configured with V-shaped, C-shaped, U-shaped recesses or recesses with random size of micron order or nanoscale under the effect of electrolysis, which can further reduce the contact area between the food and the pan body, additionally, the air in the recesses is heated and expanded to flow to form repulsion, such dual function realizes a great non-stick effect. In addition, an oxide film can further be formed on the surface of the shot-peened layer by electrolysis to change the color and improve the performance of the shot-peened layer, thereby improving the performance and the grade of the product.

Combined with the second aspect, furthermore, a plasma-polished layer is provided between the shot-peened layer and the physical vapor deposition layer.

By adopting the above solution, the concave structure and the convex structure at micron order or nanoscale can be further processed on the surface of the shot-peened layer, thereby further improving the hydrophobicity, and improving the non-stick performance of the surface of the product. The luminance of the surface of the product can also be improved through plasma-polished layer, thus improving the quality of the product.

Combined with the second aspect, furthermore, a Vickers hardness of the metal substrate is greater than or equal to 100, the shot-peened layer has a plurality of recesses, a spherical diameter of each of the plurality of recesses is 0.3-0.95 millimeters, and a range of a hole-center distance of the plurality of recesses lies in 0.3-0.8 millimeters.

It can be seen by the experience and the test that, when the process of PVD is adapted to the surface of the metal substrate with a Vickers hardness greater than 100, the formed spherical surface of the shot-peened layer has a spherical diameter of 0.3-0.95 millimeters, preferably 0.4-0.65 millimeters, wherein the range of the hole-center distance of the plurality of recesses lies in 0.3-0.8 millimeters, preferably 0.6 millimeters, such a surface has a better non-stick performance and a better wear-resistant performance.

In the third aspect, a cooking utensil is disclosed, comprising the physically non-stick structure according to the first aspect, wherein the physically non-stick structure is at least provided on a part of an area at a bottom of an inner surface of the cooking utensil.

By adopting the above solution, according to the real demand, at least a part of the inner surface of the cooking utensil can have a non-stick performance and a wear-resistant performance.

Combined with the third aspect, furthermore, the physically non-stick structure is provided in a defined area of the inner surface of the cooking utensil, and the concave structure and the convex structure are provided out of the defined area of the inner surface of the cooking utensil.

By adopting the above solution, the area at the bottom of the inner surface of the cooking utensil contacting oil and being heated is the defined area, the physically non-stick structure is provided on the defined area, which can improve the non-stick performance of the bottom during cooking with the cooking utensil. The physical non-stick structure is provided in the area of the bottom of the inner surface of the cooking utensil, which can not only realize the non-stick performance and the wear-resistant performance of the main cooking area of the bottom, but also reduce the use of the material, thereby reducing the cost. According to the demand, the physically non-stick structure can be provided on all inner surface of the cooking utensil, thereby improving the whole non-stick performance of the inner surface of the cooking utensil.

The defined area can be provided on the position at the bottom of the cooking utensil where the cooking utensil is often scratched. The physically non-stick structure is provided in this area, which enables the defined area to have the wear-resistant performance and the non-stick performance, thereby meeting the non-stick requirement of the cooking utensil. The concave structure and the convex structure are provided out of the defined area, which can realize the non-stick performance of the area out of the defined area, although the wear-resistant performance is poor, but since the area out of the defined area doesn't often contact the spoon, the requirements for the wear-resistant performance can be reduced, which can meet the non-wear resistant performance of the cooking utensil to a certain extent, and can reduce the material cost.

Combined with the third aspect, furthermore, the physically non-stick structure is at least provided in a part of an area of an outer surface of the cooking utensil.

By adopting the above solution, the physically non-stick structure is provided on the outer surface of the cooking utensil, which can improve the non-stick performance and the wear-resistant performance of the outer surface of the cooking utensil, and is convenient to clean the outer surface of the cooking utensil.

Combined with the third aspect, furthermore, the physically non-stick structure is provided in the area of the outer surface of the cooking utensil away from a bottom of the cooking utensil, or the convex structure and the convex structure are integrally provided in the area of the outer surface of the cooking utensil away from the bottom of the cooking utensil.

By adopting the above solution, the areas away from the bottom of the cooking utensil, such as a pan mouth and so on, are prone to contact the oil and be contaminated during cooking. In case that these areas are provided with the physically non-stick structure, the non-stick performance and the wear-resistant performance of these areas can be improved, and the material cost can be reduced. In case that these areas are provided with a concave structure and a convex structure, the non-stick performance of the areas can be improved. The concave structure and the convex structure integrated with the metal substrate can meet the normal wear-resistant performance because these areas have a low requirement for the non-stick performance, which can further reduce the material cost.

In the fourth aspect, a cooking utensil is disclosed, comprising a body formed by a metal substrate, a surface of the body is provided with the physically non-stick structure according to the second aspect.

By adopting the above solution, the non-stick performance of the cooking utensil with the physically non-stick structure can be improved during cooking, and the probability of food sticking to the surface of the body can be reduced, which is more convenient to clean the cooking utensil, thereby improving the cooking pleasure.

Combined with the fourth aspect, furthermore, the shot-peened layer is a concave-convex structure with a height difference of 45-85 micrometers formed by a shot peening process on an inner surface of the body after the body is formed, and a thickness of the physical vapor deposition is 0.8-1.45 micrometers.

It can be seen by the experience and the test that the concave-convex structure with the height difference of 45-85 millimeters or with the height difference of 55-75 millimeters is not only convenient to process, but also have a good hydrophobicity. The thickness of the physical vapor deposition layer is 0.8-1.45 micrometers, which can effectively realize that the physical vapor deposition layer can have a morphology similar to the concave-convex structure of the shot-peened layer, when the physical vapor deposition layer is covered on the shot-peened layer, such that the surface of the physical vapor deposition layer possesses a better non-stick performance and a better wear-resistant performance.

In the fifth aspect, a processing method for physically non-stick structure is disclosed, the processing method is configured to process the physically non-stick structure according to the first aspect on a surface of a metal substrate, and the processing method comprises:
 shaping: processing the metal substrate into a predetermined shape with a predetermined size;
 shot peening: shot peening the metal substrate after cutting or a shaped product, to form
 a shot-peened layer; and
 coating: heating the metal substrate after shot peening or the shaped product up to 200° C.-500° C., positioning the metal substrate after shot peening or the shaped product in a vacuum environment, and carrying out PVD coating on a surface of the shot-peened layer.

By adopting the above solution, the processing cost decreases and the processing efficiency increases.

In the sixth aspect, a processing method for cooking utensil is disclosed, the processing method is configured to be adapted to the cooking utensil according to the third aspect, the processing method comprises:
 shaping: processing the metal substrate into a frying pan body;
 shot peening: shot peening an inner surface of the frying pan body, to form a shot-peened layer with spherical recesses; and
 coating: heating the frying pan body after shot peening up to 200° C.-500° C., positioning the frying pan body after shot peening in a vacuum environment, and carrying out PVD coating on the inner surface of frying pan body.

By adopting the above solution, the traditional technology is abandoned, by which the metal sheet is processed with a concave-convex structure firstly and then stretched to form the body of the utensil. The metal sheet is stretched to form the body of the utensil, and then the inner surface of the body is shot peened to form the concave-convex structure, by which the technology is easy and low-cost, and no risk that the morphology of the concave-convex structure is damaged after stretching would occur, thereby better protecting the hydrophobicity of the concave-convex structure, and the non-stick performance of the product has a higher consistency.

Combined with the sixth aspect, furthermore, the processing method further comprises a process step between a step of shot peening and a step of coating, the process step comprises an electrolysis process or a plasma polishing process, to form an electrolytic layer or a plasma-polished layer on a surface of the shot-peened layer.

By adopting the above solution, the surface of the concave-convex structure formed by shot peening process can further be configured with a concave-convex structure at micron order or nanoscale, thereby further improving the hydrophobicity. In addition, the discoloration issues during processing metal substrate can be reduced.

In summary, at least one of the following beneficial technical effects is realized:
 1. A physically non-stick structure in the present application enables the surface of a metal to have a wear-resistant performance and a non-stick performance.

2. The physically non-stick structure in the present application can reduce the risk of falling off caused by two-piece structure, and has a higher strength.
3. In the physically non-stick structure in the present application, the physical vapor deposition layer directly contacts the concave structure and the convex structure without a transition layer between them, which can not only ensure a bonding force, but also reduce process steps and process cost.
4. In the cooking utensil of the present application, different areas of the cooking utensil can be provided with the physically non-stick structure according to the design demand, thereby meeting the requirements for the wear-resistant performance and the non-stick performance for cooking utensil during normal cooking, and improving the price performance of the cooking utensil.

DETAILED DESCRIPTION

In order to make the purpose, the solutions and the advantages of the Embodiments in the present application clearer, the present application is further described in detail below in combination with the drawings. The component of the Embodiments in the present application generally described and illustrated in the figures herein can be arranged or designed in various different configurations. Based on the Embodiments in the present application, all other embodiments obtained from the skilled in the art without creative work all fall in the protection scope of the present application.

It should be noted that, similar signals and similar letters are represented as similar items in the figures, therefore, once one item is defined in a figure, which is not required to be further defined or explained in the following figures.

In the description of the present application, it should be understood that, the terms of "installation", "coupling" and "connection" should be broadly understood unless there are other concrete specifications and limitations, for example, which can be a fixed connection, a detachable connection or an integrated connection; can be a mechanical connection, can be an electric connection; and can be a direct connection, can be connected by an intermediate means, and can be an inner connection between two elements. For the skilled in the art, the specific meaning of the above terms in the present application can be understood based on the actual situation.

In the present description, it should be understood that, the terms of "up", "down", "left", "right" and so on related to the orientation or location relationship are illustrated based on the orientation or location relationship illustrated in the figures, which is only for convenient describing of the present application and for simplifying the description, rather than to indicate or hint that the devices or the elements must have the specific location and are configured or operated in a specific location, which shall not be understood as a limitation of the present application.

Some embodiments of the present application is further described in detail below in combination with the drawings. The features in the following Embodiments can be combined with each other without conflict.

The cooking utensils of the present application include catering utensils and utensils for preparing dishes.

Embodiment 1

A schematic structure of a physically non-stick structure 2 of an embodiment is shown in FIGS. 1-6. The physically non-stick structure 2 is provided on a surface of a metal substrate 1, and the physically non-stick structure 2 includes a concave structure and a convex structure 3 in at least a part of the area of the concave structure, wherein at least a part of the surface of the concave structure and/or at least a part of the surface of the convex structure 3 is provided with a physical vapor deposition layer 4, and a morphology of a surface of the physical vapor deposition layer 4 is similar to a morphology of the surface of the concave structure and/or of the convex structure 3 covered by the physical vapor deposition layer.

Figure 1:
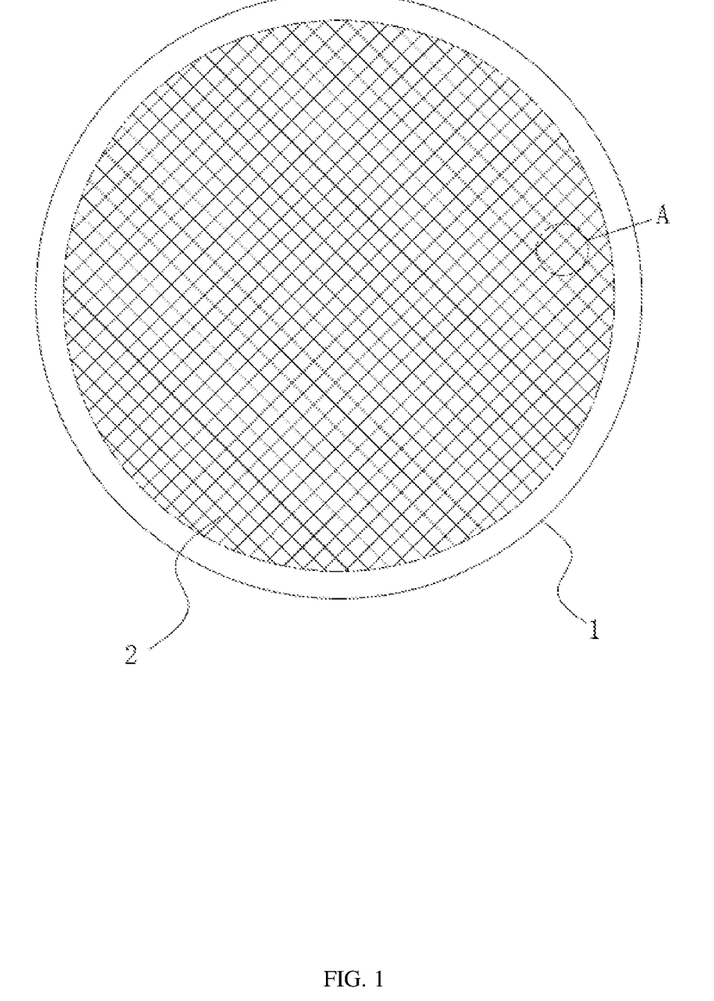
FIG. 1 is a schematic view of a metal substrate with the physically non-stick structure according to Embodiment 1 of the present application.

Referring to FIG. 1, the physically non-stick structure 2 of the present embodiment is integrally processed on the defined area of the surface of the metal substrate 1 by processes such as etching and so on, wherein the physically non-stick structure 2 of the present embodiment is processed on the surface of the metal substrate 1 by chemical etching and physical etching.

Figure 2:
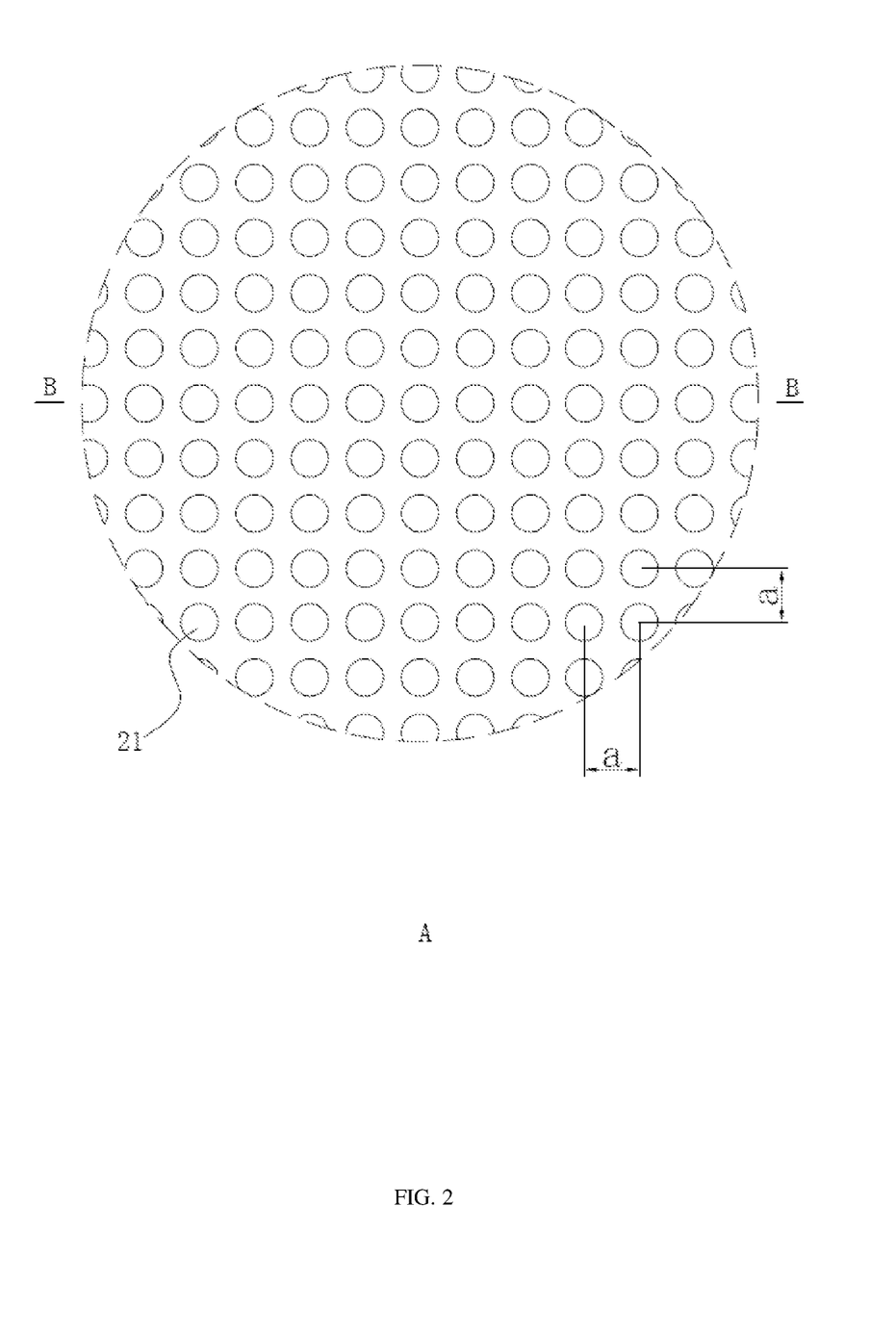
FIG. 2 is an enlarged diagram of portion A in FIG. 1.

Referring to FIG. 2, the physically non-stick structure 2 includes a concave structure, in which the concave structure is formed by a plurality of recesses 21 arranged in an orthogonal array. The cross section of the recess 21 of the present embodiment is a circle, which can be a polygon such as a hexagon or a quadrilateral according to production requirements. The diameter of the recess 21 is 0.3-0.55 millimeters, and preferably 0.4-0.45 millimeters. The hole-center distance a of the adjacent recesses 21 is between 0.6 to 0.8 millimeters, and preferably 0.6 millimeters. If the recess 21 is shaped as a polygon, the polygons are evenly distributed, and the diameter of the inscribed circle of the polygon is 0.3-0.55 millimeters, and preferably 0.4-0.45 millimeters.

Figure 3:
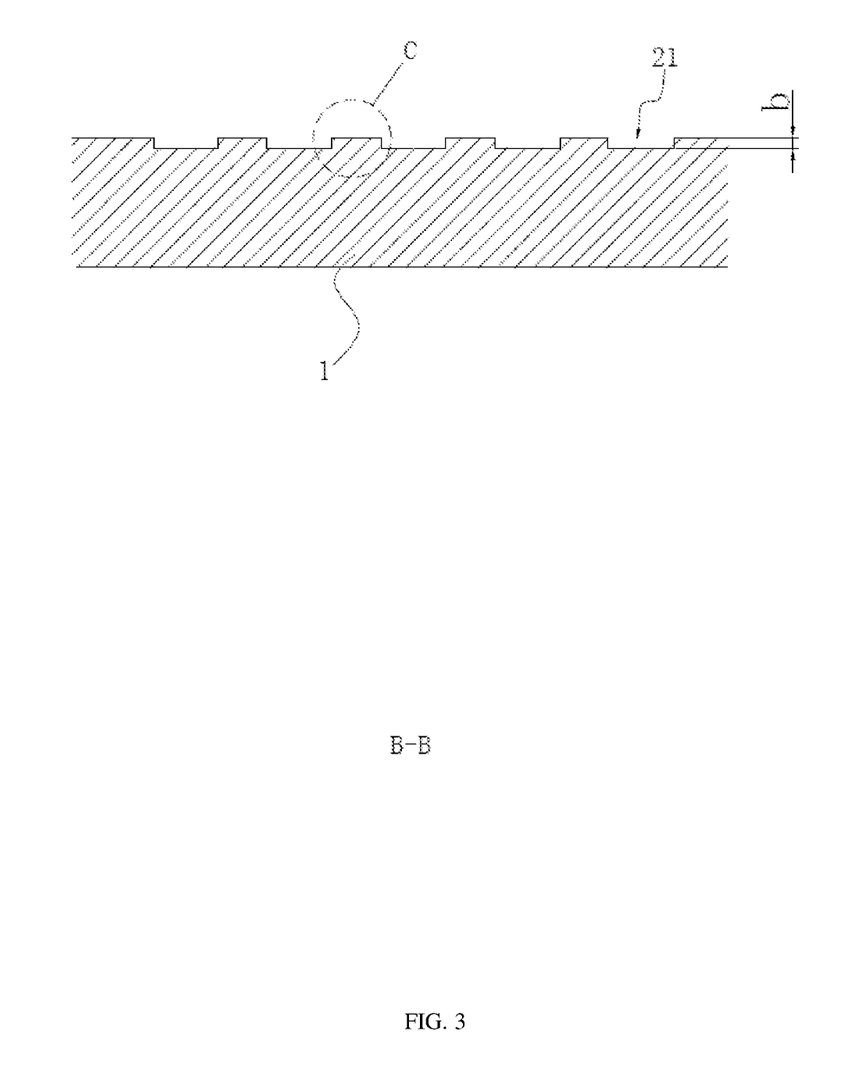
FIG. 3 is a cross sectional view of B-B in FIG. 2.

Referring to FIG. 3, the recesses 21 are processed by chemical etching on the surface of the metal substrate 1, the hole depth b of the recess 21 is 45-85 micrometers, and preferably is 55-75 micrometers.

Figure 4:
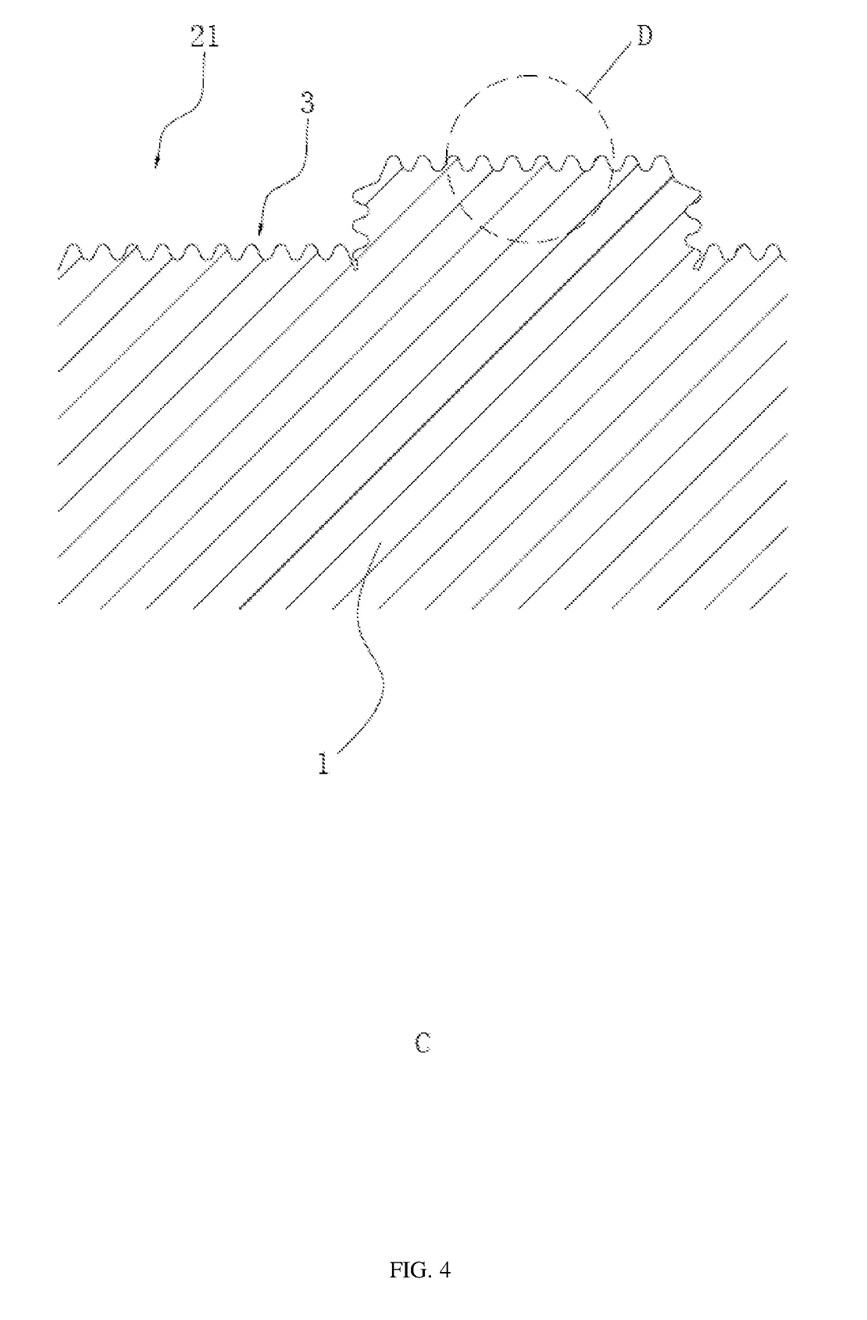
FIG. 4 is an enlarged diagram of portion C in FIG. 3.

Referring to FIG. 4, the convex structure 3 is processed on the surface of the concave structure by etching, the etching for the convex structure 3 of the present embodiment is physical etching.

Figure 5:
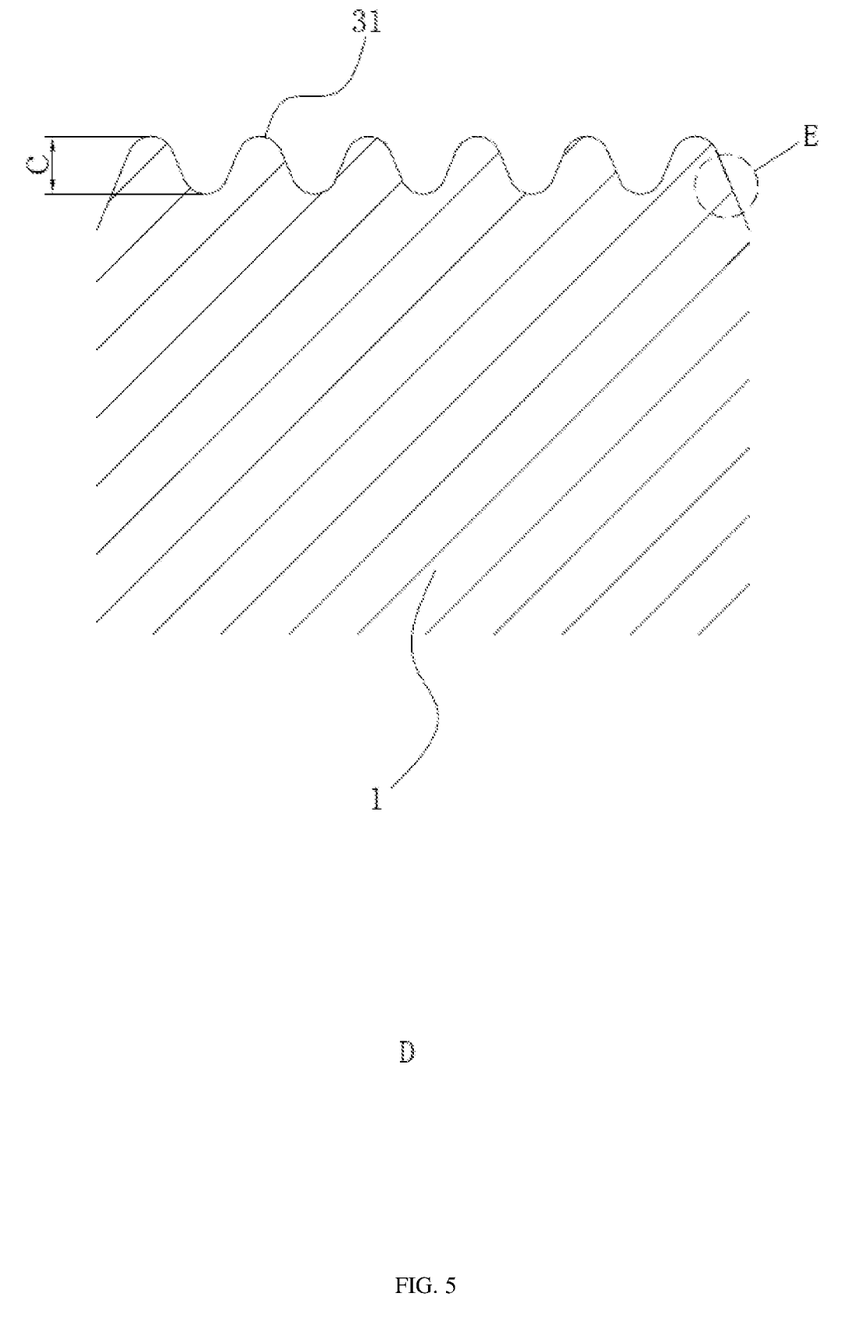
FIG. 5 is an enlarged diagram of portion D in FIG. 4.

Referring to FIG. 5, the convex structure 3 includes a plurality of protrusions 31 at least on at least a part of the surface of the concave structure, in which the height of the protrusion 31 is 0.1-0.3 micrometers. This figure only illustrates the structure of the protrusion 31. When the surface of the concave structure is etched with a plasma source, the shape of the protrusion 31 is irregular, but the height range of each of the protrusions 31 should be controlled in 0.1-0.3 micrometers.

Figure 6:
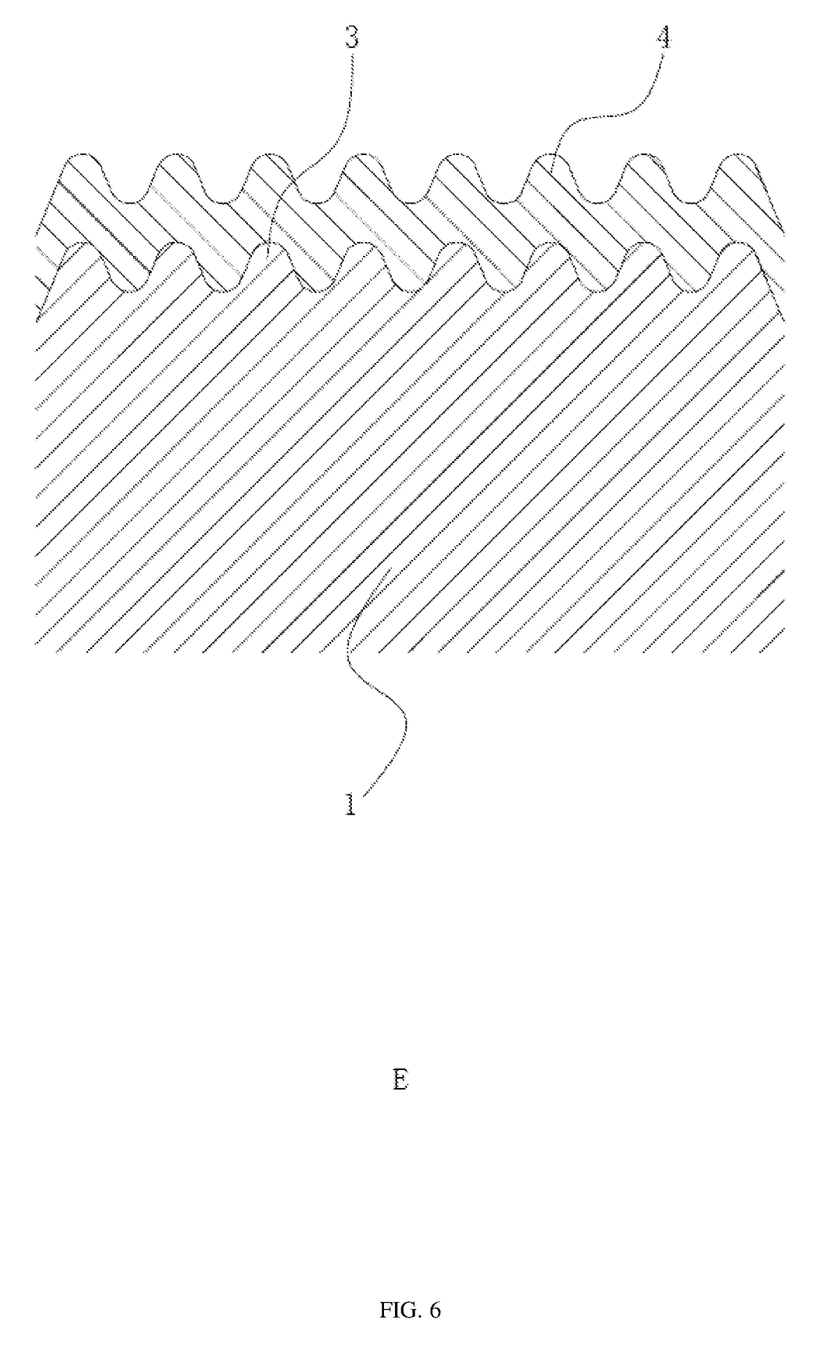
FIG. 6 is an enlarged diagram of portion E in FIG. 5 after rotation.

Referring to FIG. 6, the surface of at least a part of the concave structure and/or the convex structure 3 is provided with the physical vapor deposition layer 4. It can be realized by setting and controlling the parameters of the PVD coating process that the morphology of the surface of the physical vapor deposition layer 4 is similar to the morphology of the surface of the concave structure and/or of the convex structure 3 covered by the physical vapor deposition layer, so as to realize the non-stick effect of the surface of the metal substrate 1. The physical vapor deposition layer 4 directly contacts the concave structure and/or the convex structure 3, in which the thickness of the physical vapor deposition layer 4 is 0.8-1.45 micrometers. The conventional PVD layer cannot directly contact the metal substrate 1 for bonding, by which a transition layer must be provided between the PVD layer and the metal substrate 1, such as in the patent application serial no. CN202121169683.5 and CN202222426611.5 the solution with a transition layer is adopted to realize the bonding. The transition layer can not only have better adhesion to the layer, but also have better adhesion to the metal substrate 1, thereby ensuring good adhesion between the PVD layer and the metal substrate 1, such that it is difficult to fall off. The physically non-stick structure 2 in the present application possesses a new structure through theory analysis and a long-term experience and test, wherein the related structure is directly processed on the surface of the metal substrate 1, which can realize a good adhesion between the PVD layer and the metal substrate 1, improve the non-stick performance of the surface of the metal substrate 1, and have a wear-resistant performance, thereby ensuring the wear-resistant and non-stick performance of the surface of the metal substrate 1 for a long time. The present metal substrate 1 is a metal material such as a carbon steel, an alloy steel, a stainless steel, a titanium alloy and so on.

A part of the concave structure is provided with the convex structure 3, and the surface of a part of the convex structure 3, or the surface of a part of the concave structure, or the surface of a part of the concave structure and of a part of the convex structure 3 is coated with the physical vapor deposition layer 4, by which a plurality of combined structures can be realized on surface of the metal substrate 1, thereby realizing different surface effects according to different using demands, or realizing different surface effects on the surface of the metal substrate in different areas. Performance Comparison Test of Different Parameters:

| Serial Number | Parameter/ Performance | adhesion | Surface hardness | Non-stick effect by frying egg |
|---|---|---|---|---|
| 1 | The thickness of the physical vapor deposition layer is less than 0.8 µm, and the depth of PVD etching is less than 0.1 µm | level 3 | 600-800HV | level III |
| 2 | The thickness of the physical vapor deposition layer is less than 0.8 µm, and the depth of PVD etching is greater than 0.3 µm | above level 2 | 300-800HV | level III |
| 3 | The thickness of the physical vapor deposition layer is greater than 1.45 µm, and the depth of PVD etching is less than 0.1 µm | level 3 | 1500-2000HV | level III |
| 4 | The thickness of the physical vapor deposition layer is greater than 1.45 µm, and the depth of PVD etching is greater than 0.3 µm | above level 2 | 1500-2000HV | level III |
| 5 | The thickness of the physical vapor deposition layer is 0.8 µm, and the depth of PVD etching is 0.1-0.3 µm | above level 2 | 1500-2000HV | level II |
| 6 | The thickness of the physical vapor deposition layer is 0.95 µm, and the depth of PVD etching is 0.1-0.3 µm | above level 2 | 1500-2000HV | level II |
| 7 | The thickness of the physical vapor deposition layer is 1.1 µm, and the depth of PVD etching is 0.1-0.3 µm | above level 2 | 1500-2000HV | level II |
| 8 | The thickness of the physical vapor deposition layer is 1.45 µm, and the depth of PVD etching is 0.1-0.3 µm | above level 2 | 1500-2000HV | level II |

It can be seen from the performance comparison test that the comprehensive performance is optimal by the thickness of the physical vapor deposition layer in the range of 0.8-1.45 µm and the depth of PVD etching in the range of 0.1-0.3 µm of items 5-8, and the cost of these parameter ranges is also the most reasonable.

When the thickness of the physical vapor deposition layer is less than 0.8 µm and the depth of PVD etching is less than 0.1 µm, the layer adhesion is poor and only reaches level 3, therefore, it is easy to fall off; the hardness of 600-800 HV is insufficient, therefore, the wear-resistant performance is poor; and the non-stick effect by frying egg is at level III and is poor.

When the thickness of the physical vapor deposition layer is less than 0.8 µm, and the depth of PVD etching is greater than 0.3 µm, the hardness of the layer is 300-800 HV, and is insufficient, the wear-resistant performance is poor; and the non-stick effect by frying egg is at level III and is poor.

When the thickness of the physical vapor deposition layer is greater than 1.45 µm, and the depth of PVD etching is less than 0.1 µm, the layer adhesion is very poor and only reaches level 3, it is easy to fall off; although the hardness of 1500-200 HV can meet the requirement, but this way wastes raw material and increases costs, and the non-stick effect by frying egg is at level III and is poor.

When the thickness of the physical vapor deposition layer is greater than 1.45 μm, and the depth of PVD etching is greater than 0.3 μm, the adhesion can be above level 2 and the hardness of 1500-200 HV can meet the requirements, but this way wastes raw material and increases costs, and the non-stick effect by frying egg is at level III grade and is poor.

When the thickness of the physical vapor deposition layer is in the range of 0.8-1.45 μm, and the depth of PVD etching is in the range of 0.1-0.3 μm, the adhesion can reach level 2, the hardness in 1500-2000 HV, the non-stick effect by frying egg is at level II, which is the most cost-effective.

Embodiment 2

Figure 7:
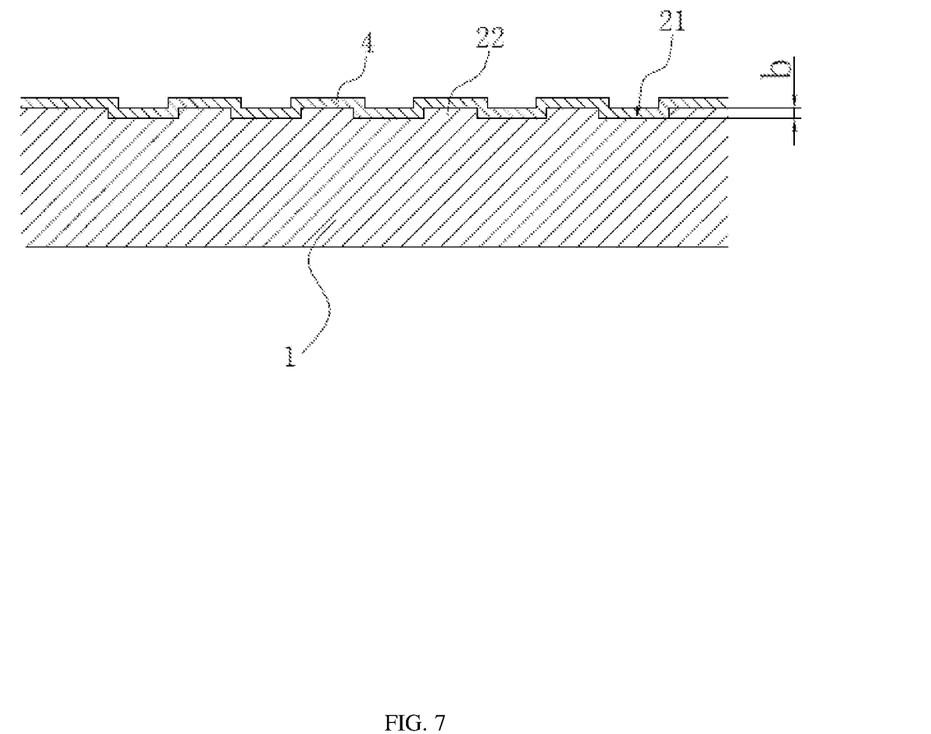
FIG. 7 is a schematic view of the physically non-stick structure according to Embodiment 2 of the present application.

FIG. 7 schematically shows the structure of the physically non-stick structure 2 of the second embodiment. The physically non-stick structure 2 includes a shot-peened layer 22 on a surface of the metal substrate 1, a physical vapor deposition layer 4 is provided on the surface of the shot-peened layer 22, the recesses 21 on the surface of the metal substrate 1 are processed by shot peening process, and the morphology of the surface of the physical vapor deposition layer 4 is similar to the morphology of the surface of the shot-peened layer 22 covered by the physical vapor deposition layer.

The physically non-stick structure 2 of the present embodiment is integrally formed on the defined area of the surface of the metal substrate 1 through the processes such as shot peening process, or rolling and so on, and then is plated with PVD layer.

The shot-peened layer 22 is a concave-convex structure processed on the surface of the metal substrate 1 through the shot peening process, the shot-peened layer 22 is formed by a plurality of recesses 21 arranged in a regular or irregular manner, wherein the cross section of the recess 21 in the present embodiment is a circle. The diameter of the recess 21 is 0.3-0.95 millimeters, and preferably is 0.4-0.65 millimeters. The recess 21 is a spherical recess 21 by spraying the steel shots of 0.6-1 millimeters to the surface of the metal substrate 1 under the pressure of 2 Mpa-8 Mpa, and the above-mentioned diameter of the recess 21 is a spherical diameter. The recess can be processed into a circle, an ellipse or a polygon, such as a hexagon or a quadrilateral according to the design requirements via the processes such as rolling and so on. The range of the hole center distance a of adjacent recesses 21 lies in 0.3-0.8 millimeters, and preferably is 0.6 millimeters, wherein the range of the hole center distance a herein is the distance between the spherical centers of adjacent recesses 21. If the recess 21 is shaped as a polygon, the polygon can be evenly distributed by rolling or distributed in an irregular manner according to the design requirements, the diameter of the inscribed circle of the polygon is 0.3-0.95 millimeters, and preferably is 0.4-0.65 millimeters.

The shot-peened layer 22 is a surface, which is formed by connecting the protrusions 31 between a recess 21 and other recesses 21, the recesses are formed by shot peening processing the inner surface of the body after the body is formed. The depth b of the recess is 45-85 micrometers, and preferably is 55-75 micrometers. The shot-peened layer 22 is integrally formed with the metal substrate 1, and the physical vapor deposition layer 4 directly contacts the shot-peened layer 22.

The surface of at least a part of the shot-peened layer 22 is provided with the physical vapor deposition layer 4, the thickness of the layer can be controlled by setting the parameters of the PVD coating technology, such that the morphology of the surface of the physical vapor deposition layer 4 is similar to the morphology of the surface of the shot-peened layer 22 covered by it, so as to reach the non-stick effect of the surface of the metal substrate 1. The physical vapor deposition layer 4 directly contacts the shot-peened layer 22, wherein the thickness of the physical vapor deposition layer 4 is 0.8-1.45 micrometers. The conventional PVD layer cannot directly contact the metal substrate 1 for bonding, by which a transition layer must be provided between the PVD layer and the metal substrate 1, such as in the patent application serial no. CN202121169683.5 and CN202222426611.5 the solution with a transition layer is adopted to realize a bonding. The transition layer can not only have better adhesion to the layer, but also have better adhesion to the metal substrate 1, thereby ensuring good adhesion between the PVD layer and the metal substrate 1, such that it is difficult to fall off. The physically non-stick structure in the present application possesses a new structure through theory analysis and the long-term experience and test, wherein the corresponding convex-concave structure is directly processed on the surface of the metal substrate 1 through a shot peening process, which can realize a good adhesion between the PVD layer and the metal substrate 1, improve the non-stick performance of the surface of the metal substrate 1, and have a wear-resistant performance, thereby ensuring the wear-resistant and non-stick performance of the surface of the metal substrate 1 for a long time. The metal substrate 1 is made of a metal material such as a carbon steel, an alloy steel, a stainless steel, a titanium alloy and so on.

Embodiment 3

Referring to FIG. 7, this embodiment differs from Embodiment 2 in that an electrolytic layer or a plasma-polished layer is additionally provided between the shot-peened layer 22 and the physical vapor deposition layer 4. The surface of a part of the shot-peened layer 22 is provided with the electrolytic layer or the plasma-polished layer, and the surface of a part of the electrolytic layer or the plasma-polished layer, or the surface of a part of the shot-peened layer 22, or the surface of a part of the shot-peened layer 22 and a part of the electrolytic layer or the plasma-polished layer is plated with the physical vapor deposition layer 4, wherein a plurality of combined structures can be formed on the surface of the metal substrate 1, realizing different surface effects according to different using demands, or realizing different surface effects on the surface of the metal substrate 1 in different areas.

Referring to FIG. 6, this embodiment differs from Embodiment 1 in that the convex structure 3 is processed on the surface of the shot-peened layer 22 by electrolytic process or plasma polishing process, wherein the convex structure 3 is formed by the electrolytic process in the present embodiment.

Referring to FIG. 5, this embodiment differs from Embodiment 1 in that the convex structure 3 includes a plurality of protrusions 31 at least provided on at least a part of the surface of the shot-peened layer 22, wherein the height of the protrusion 31 is 45-85 micrometers, and the electrolytic layer is a surface formed by connecting a protrusion 31 and other protrusions 31. This figure only illustrates the structure of the protrusions 31. When the surface of the shot-peened layer 22 is processed via an electrolytic process or a plasma polishing process, the shape of the protrusion 31 is irregular, but the height range of each of the protrusions 31 must be controlled in 45-85 micrometers.

Embodiment 4

Figure 8:
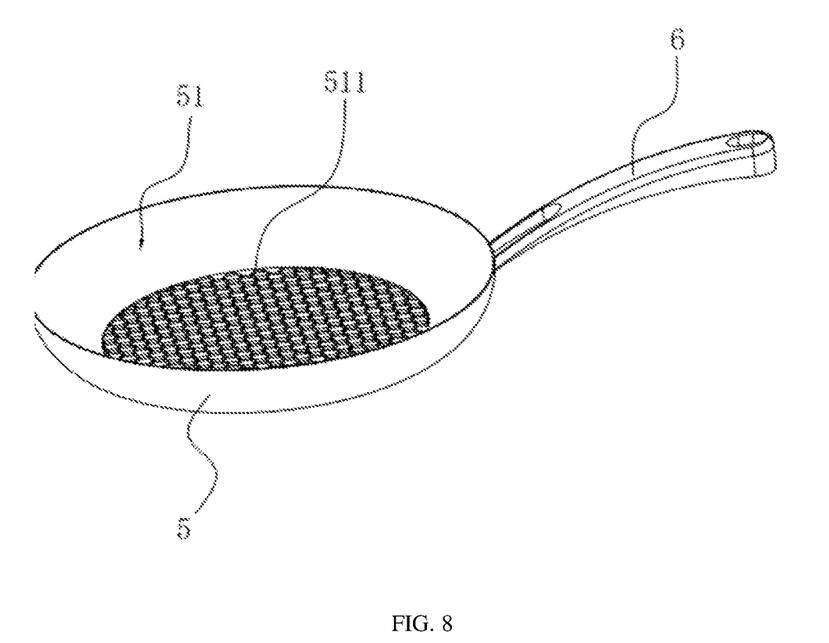
FIG. 8 is a schematic view of a cooking utensil according to Embodiment 1 of the present application.

Referring to FIG. 8, the present Embodiment discloses a cooking utensil, and particularly a frying pan. The frying pan includes a pan body 5 and a handle 6, and a bottom area 511 of the inner surface 51 of the pan body 5 is provided with the physically non-stick structure 2 of any one of the above Embodiments. In practice, in order to realize a better non-stick performance, all area of the inner surface 51 of the pan body 5 can be provided with the physically non-stick structure 2. The frying pan is taken as an example to illustrate the present embodiment, in practice, the present physically non-stick structure 2 can be applied to any surface of all cooking utensils including catering utensils and utensils for preparing dishes and including but not limited to the containers of cooking utensils (the cup body of a soybean milk machine; or the inner container of an electric cooker, of a pressure cooker, of an electric chafing dish; or an oven body), the body of a juicer, a scoop and so on.

Embodiment 5

Figure 9:
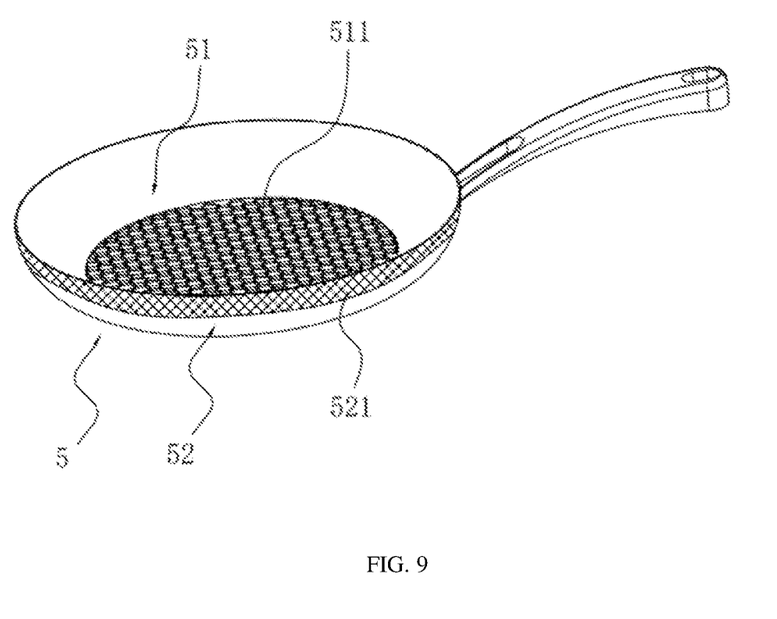
FIG. 9 is a schematic view of the cooking utensil according to Embodiment 2 of the present application.

Referring to FIG. 9, this embodiment differs from Embodiment 4 in that the outer surface 52 of the pan body 5 of the present embodiment is also provided with the physically non-stick structure 2, and the physically non-stick structure 2 is provided at the pan mouth away from the pan bottom. In practice, in order to realize a good non-stick performance of the outer surface 52, all area of the outer surface 52 can be provided with the physically non-stick structure 2. Or the concave structure and the convex structure 3 can be integrally formed in the area of the pan mouth 521 of the outer surface 52 of the pan body 5 away from the pan bottom.

Embodiment 6

Referring to FIGS. 1-7, the present embodiment further discloses a processing method for physically non-stick structure, which is configured for processing the physically non-stick structure 2 in Embodiment 1, Embodiment 2 or Embodiment 3 on the surface of a metal substrate 1. The processing method includes:
  Shaping: processing the metal substrate 1 into a predetermined shape with a predetermined size;
  Shot peening: shot peening the metal substrate 1 after cutting or the shaped product; spraying the steel shots of 0.6-1 millimeters under the pressure of 2 Mpa-8 Mpa for 3 second-5 minutes onto the surface of the metal substrate 1 or the surface of the shaped product, to form a shot-peened layer 22 with spherical recesses 21; and
  Coating: heating the metal substrate 1 after shot peening or the shaped product up to 200° C.-500° C., positioning it in a vacuum environment, and carrying out PVD coating on the inner surface.

Embodiment 7

Referring to FIGS. 8-9, the present embodiment discloses a processing method for cooking utensil, which is adaptive for the cooking utensils in Embodiment 4 or Embodiment 5, and the processing method includes:
  Shaping: processing the metal substrate 1 into a frying pan body 5;
  Shot peening: shot peening the inner surface 51 of the frying pan body 5; spraying the steel shots of 0.6-1 millimeter under the pressure of 2 Mpa-8 Mpa for 3 seconds-5 minutes onto the inner surface 51 of the frying pan body 5, to form a shot-peened layer 22 with spherical recesses 21;
  Electrolyzing: electrolyzing the surface of the shot-peened layer 22, to form an electrolytic layer; and
  Coating: heating the electrolyzed frying pan body 5 up to 200° C.-500° C., positioning it in the vacuum environment, and carrying out PVD coating on the inner surface 51 of frying pan body.

The above are the basic principle, the main features and advantages of the present application. It should be understood by those skilled in the art that the present application is not limited by the above-mentioned embodiments, what is described in the above-mentioned embodiments and specifications only illustrates the principles of the present application. Without departing from the spirit and scope of the present application, there will be many changes, modifications, substitutions and variants of the present application, which fall within the scope of the claimed invention.

LIST OF REFERENCE SIGNS 1 metal substrate
2 physically non-stick structure
21 recess
22 shot-peened layer
3 convex structure
31 protrusion
4 physical vapor deposition layer
5 pan body
51 inner surface
511 bottom area
52 outer surface
521 area of pan mouth
6 handle
a hole center distance
b hole depth
c height of protrusion

What is claimed is:

1. A physically non-stick structure configured for being applied to a surface of a metal substrate, comprising a concave structure and a convex structure in at least a part of an area of the concave structure, wherein at least one of at least a part of a surface of the concave structure or at least part of a surface of the convex structure is provided with a physical vapor deposition layer, and a morphology of a surface of the physical vapor deposition layer is the same as at least one of a morphology of the surface of the concave structure or a morphology of the surface of the convex structure covered by the physical vapor deposition layer,
  wherein the convex structure comprises a plurality of protrusions at least on the part of the surface of the concave structure, and a height of each of the plurality of protrusions is 0.1-0.3 micrometers.

2. The physically non-stick structure according to claim 1, wherein the concave structure and the convex structure are integrated with the metal substrate, and the physical vapor deposition layer directly contacts at least one of the concave structure or the convex structure.

3. The physically non-stick structure according to claim 1, wherein the concave structure comprises a plurality of recesses, and each of the plurality of recesses has a depth of 45-85 micrometers.

4. The physically non-stick structure according to claim 3, wherein the concave structure is formed by the plurality of recesses arranged in an orthogonal array, and each of the plurality of recesses has a diameter of 0.3-0.55 millimeters, a depth of 55-75 micrometers, and a hole center distance of 0.6-0.8 millimeters.

5. The physically non-stick structure according to claim 1, wherein a thickness of the physical vapor deposition layer is 0.8-1.45 micrometers.

6. A cooking utensil, comprising the physically non-stick structure according to claim 1, wherein the physically non-stick structure is at least provided on a part of an area at a bottom of an inner surface of the cooking utensil.

7. The cooking utensil according to claim 6, wherein the physically non-stick structure is provided in a defined area of the inner surface of the cooking utensil, and the concave structure and the convex structure are provided outside of the defined area of the inner surface of the cooking utensil.

8. The cooking utensil according to claim 6, wherein the physically non-stick structure is at least provided in a part of an area of an outer surface of the cooking utensil.

9. The cooking utensil according to claim 8, wherein the physically non-stick structure is provided in the area of the outer surface of the cooking utensil away from a bottom of the cooking utensil, or the convex structure and the convex structure are integrally provided in the area of the outer surface of the cooking utensil away from the bottom of the cooking utensil.

10. A physically non-stick structure configured for being applied to a surface of a metal substrate, comprising a concave structure and a convex structure in at least a part of an area of the concave structure, wherein at least one of at least a part of a surface of the concave structure or at least part of a surface of the convex structure is provided with a physical vapor deposition layer, and a morphology of a surface of the physical vapor deposition layer is the same as at least one of a morphology of the surface of the concave structure or a morphology of the surface of the convex structure covered by the physical vapor deposition layer,
wherein the concave structure comprises a plurality of recesses, and each of the plurality of recesses has a depth of 45-85 micrometers,
wherein the concave structure is formed by the plurality of recesses arranged in an orthogonal array, and each of the plurality of recesses has a diameter of 0.3-0.55 millimeters, a depth of 55-75 micrometers, and a hole center distance of 0.6-0.8 millimeters.

* * * * *